(12) United States Patent
Lewis et al.

(10) Patent No.: US 8,064,589 B2
(45) Date of Patent: Nov. 22, 2011

(54) ESTIMATING NUMBER OF AGENTS FOR MULTIPLE CHAT CHANNELS

(75) Inventors: Donald C. Lewis, Bell Buckle, TN (US); Aaron C. Beshears, Franklin, TN (US)

(73) Assignee: Aspect Software, Inc., Westford, MA (US)

( * ) Notice: Subject to any disclaimer, the term of this patent is extended or adjusted under 35 U.S.C. 154(b) by 824 days.

(21) Appl. No.: 12/214,754

(22) Filed: Jun. 20, 2008

(65) Prior Publication Data

US 2009/0316873 A1 Dec. 24, 2009

(51) Int. Cl.
*H04M 3/00* (2006.01)
(52) U.S. Cl. .............................. 379/265.02; 379/265.09
(58) Field of Classification Search ............. 379/265.02, 379/265.09
See application file for complete search history.

(56) References Cited

U.S. PATENT DOCUMENTS

| | | | |
|---|---|---|---|
| 4,881,261 | A | 11/1989 | Oliphant et al. |
| 5,517,566 | A | 5/1996 | Smith et al. |
| 6,496,580 | B1 | 12/2002 | Chack |
| 6,853,721 | B2 | 2/2005 | Mengshoel et al. |
| 6,856,680 | B2 | 2/2005 | Mengshoel et al. |
| 6,865,267 | B2 | 3/2005 | Dezonno |
| 7,010,115 | B2 | 3/2006 | Dezonno et al. |

*Primary Examiner* — Rasha Al Aubaidi
(74) *Attorney, Agent, or Firm* — Husch Blackwell LLP (57) ABSTRACT

Method and system of estimating a number of agents to service contacts arriving on multiple chat channels in an automatic contact distribution system. In some embodiments, estimated average times that agents and contacts spend, respectively, composing a single chat message and an estimated average time of a chat session are used to derive an inflated handle time for any selected number of chat channels, an effective number of agents is computed for the inflated handle time, and that effective number of agents is divided by the selected number of channels.

30 Claims, 6 Drawing Sheets

ESTIMATING NUMBER OF AGENTS FOR MULTIPLE CHAT CHANNELS

This invention pertains to estimating a number of agents to service contacts arriving on multiple chat channels in an automatic contact distribution (ACD) system.

DETAILED DESCRIPTION OF SOME EMBODIMENTS

While the present invention is susceptible of embodiment in various forms, there is shown in the drawings and will hereinafter be described some embodiments with the understanding that the present disclosure is to be considered an exemplification of the invention and is not intended to limit the invention to the specific embodiments illustrated or described.

Among other functions, ACD systems distribute telephone calls or other contacts that are made to an organization. Typically, these contacts are serviced by an agent—for example, a person who takes the order, answers the question, and so forth. One type of contact distributed by ACD systems is a chat message session. Chat is a term that has evolved as a name for a type of electronic messaging done over a network involving short messages sent from one node to another, usually in real-time with quick replies. That is, it is real-time communication between at least two parties via an electronic communication network. While the term contact can refer to a type of communication, it also is used to refer to a party of such communication such as a person contacting the organization or being contacted by the organization. For example, a chat session will occur between an agent of an organization and a contact. The meaning of "agent" and the meaning of "contact" generally are apparent from their usages, and are intended below to refer to parties of a chat unless otherwise indicated.

For any ACD system, the subject matter of possible communications may be include multiple categories. For example, there may be sales of different products or services, there may be technical support regarding the operation of different products or services, there may be billing or accounting matters, and so forth. Different agents will have different capabilities for conducting communications in different categories. For example, an agent may be very knowledgeable about technical support for one product, not as knowledgeable about technical support for a different product, and relatively ignorant about billing matters. Similarly, different contacts may have different capabilities. For example, a patient will likely have less capability to discuss an insurance payment matter with a health insurance company, than would a bookkeeper who works for a health care provider. Consequently, agents and contacts can both be categorized. Such categories may depend on the subject matter of the communication and also may depend on the person's level of skill in chat messaging. For example, such categories can be based on communication subject matter, training in the communication subject matter, experience in the communication subject matter, training in chat messaging, experience in chat messaging, training in multi-channel chat messaging, and experience in multi-channel chat messaging, etc.

For purposes of this application, the applicants also define the following terms:

(a) A chat message is a unit of communication that is composed by a sender during some interval of time. At the end of the composition interval, the sender triggers a send event and the message is sent as a unit and without significant delay to a recipient.

(b) A single-channel chat session is some number of exchanges of chat messages between one agent and one contact.

(c) Single agent multi-channel chat is an ongoing exchange of chat messages between one agent and multiple contacts, subject to the restriction that contacts do not exchange chat messages among themselves.

(d) The number of channels in a multi-channel chat is the maximum possible number of contacts that can be participating in the multi-channel chat at any given moment.

(e) Multiple agent multi-channel chat is a configuration of an ACD system in which many agents simultaneously engage in single agent multi-channel chat. In this case, the messaging is constrained so that no contact participates in more than one chat session at a time, and so that any messaging among agents does not interfere with the dynamics of message exchanges among agents and contacts.

(f) Handle time is the average duration of a single-channel chat session.

(g) Multi-channel chat is described as being single skill, when all of the agents are of a single category and all of the contacts are of a single category.

Furthermore, the symbol "*" is used to denote ordinary multiplication, as in 2*3=6.

In administering an ACD system, it is desirable to estimate accurately the number of agents required to service chat messaging when each agent is simultaneously handling a fixed number of chat channels. For a single agent, the length of any chat session with a contact depends in a non-trivial way on the number of other contacts the agent is servicing. This dependency occurs because both agents and contacts can find themselves waiting for individual messages to be completed, and the statistics of these waits depend on the number of chat channels the agent is servicing. Such statistics also critically depend on the relative speeds with which both agents and contacts complete the individual messages that comprise a chat session. If the number of agents required to service chat messaging when each agent is simultaneously handling a certain number of chat channels can be estimated accurately, then a minimum number of agents required to achieve a specified service experience can be selected where, for example, a shorter chat session duration is considered to be a better service experience. For example, the number of agents allocated for chat messaging, as opposed to other types of communication, can be determined. For example, the cost of additional agents can be balanced against the benefits of enhancing the quality of service.

In principle, the number of agents required to service chat messaging when each agent is simultaneously handling a fixed number of chat channels could be found by the fundamental techniques of queuing theory. This approach becomes difficult when the number of agents, queue sizes, and chat channels are very large. The number of simultaneous equations that need to be solved explodes with increasing numbers, and it is difficult to solve such systems of equations.

It is also difficult to create a multi-channel chat simulation to estimate the number of agents required to service chat messaging when each agent is simultaneously handling a fixed number of chat channels.

The preferred embodiments are simpler and their derivation is discussed by first considering the case of a single agent servicing multiple chat sessions. The probabilities that either agents or any number of contacts are idle and waiting to receive a message are considered. These probabilities describe a kind of occupancy that is internal to a chat session and distinct from occupancies associated with idle time between chat sessions. The insights of that analysis are used to derive a formula for the inflation of the handle time of chat sessions due to multiple channels of chat. The inflated handle time is used to estimate the number of agents required to service chat messaging when each agent is simultaneously handling a fixed number of chat channels.

A. Single Agent Servicing Multiple Chat Channels.

First, the case of single agent multi-channel chat is considered. For a very small time interval, dt, the probability that a contact who is composing a chat message will trigger a send event between time, t, and time, t+dt, is assumed to be approximately c*dt. Here, c is a positive number characterizing the instantaneous rate at which contacts complete and send the messages they are composing. Similarly, the probability that an agent who is composing a chat message will trigger a send event between time, t, and time, t+dt, is assumed to be approximately a*dt. Here, a is a positive number characterizing the instantaneous rate at which agents complete and send messages they are composing.

The value of a, the instantaneous rate at which agents complete and send messages they are composing, may depend both on the category of agent and on the category of contact. That is, the agent's ability to compose messages quickly may depend both, for example, on the agent's own capabilities and on the contact's capabilities. Similarly, the value of c also may depend on the category of agent and on the category of contact. For a particular category of agent and a particular category of contact, it is assumed that c is a constant for all messages composed by contacts. Its value is characteristic of an "agent category-contact category pair." Similarly, for an agent category-contact category pair, it is assumed that a is a constant for each message composed by agents and that its value is characteristic of the agent category-contact category pair.

The dimensionless quantity, r, is defined as r=a/c. It is the ratio of the respective instantaneous rates at which agents and contacts complete and send messages they are composing. For a particular agent category-contact category pair, a and c are each constant and r also may be thought of as the ratio of the average time the contact spends composing chat messages to the average time the agent spends composing chat messages, during the course of a single-channel chat session. The quantity, r, expresses the impact of different agent category-contact category pairs on the probabilities that agents or contacts will be idle.

During an arbitrarily long period of multi-channel chat in which a single agent services a constant number of channels, m, the m channels are saturated if a new contact immediately initiates a new chat session by composing a message into a channel once an agent has sent a final message closing a chat session on that channel.

P[m](n) is used to denote the probability that exactly n contacts are idle and waiting for a message to be sent from the agent. Here, m is the number of channels, and n is a number in the set {0, 1, 2, . . . , m}. For example, P[m](0) is the probability that no contact is idle. That is, all the contacts are busy composing messages so P[m](0) is also the probability that the agent is idle. Meanwhile P[m](m) is the probability that all the contacts in the m channels are idle and waiting to receive a message from the agent.

In single skill chat, only a single agent category-contact category pair applies, and a and c are assumed to be constants. The system of m+1 differential equations describing the time evolution of these m+1 probabilities is given by $$dP[m](0)/dt = -c*m*P[m](0) + a*P[m](1)$$

$$dP[m](1)/dt = c*m*P[m](0) - (a+c*(m-1))*P[m](1) + a*P[m](2)$$

$$dP[m](2)/dt = c*(m-1)*P[m](1) - (a+c*(m-2))*P[m](2) + a*P[m](3)$$

. . .

$$dP[m](n)/dt = c*(m-n+1)*P[m](n-1) - (a+c*(m-n))*P[m](n) + a*P[m](n+1)$$

. . .

$$dP[m](m-1)/dt = c*(2)*P[m](m-2) - (a+c)*P[m](m-1) + a*P[m](m)$$

$$dP[m](m)/dt = c*P[m](m-1) - (a)*P[m](m)$$

Using this system of equations, one can solve for the equilibrium probability distribution for the random variable, n, representing that exactly n contacts are waiting for a reply from the agent.

At equilibrium, and using that r=a/c, the probability that exactly n contacts are idle is given by $$P[m](n) = (r^{(m-n)}/(m-n)!) * (1/(1 + r/1! + r^2/2! + \ldots + r^m/m!))$$

for n=0, 1, . . . , m.

Defining Q[m](n) by the rule Q[m](n)=P[m](m−n), for n=0, 1, . . . , m, yields $$Q[m](n) = (r^n/n!) * (1/(1 + r/1! + r^2/2! + \ldots + r^m/m!))$$

This expression for Q is a well-known quantity in telecommunications. In particular, the formula for Q[m](m) is the same formula that gives the "blocking probability" in the Erlang B model for m servers (or trunks). It is seen that Q[m](m)=P[m](0). Therefore, the probability that the agent is idle in a saturated m-channel chat is given by the same formula as the formula for the probability that all trunks are "busy" in Erlang B. Consequently, when all of the contacts are of a single category, the probability that the agent is idle in saturated, single agent multi-channel chat is given by a formula that depends only on the number of channels and the ratio of the completion rates of agent and contact messages, a and c.

Figure 1:
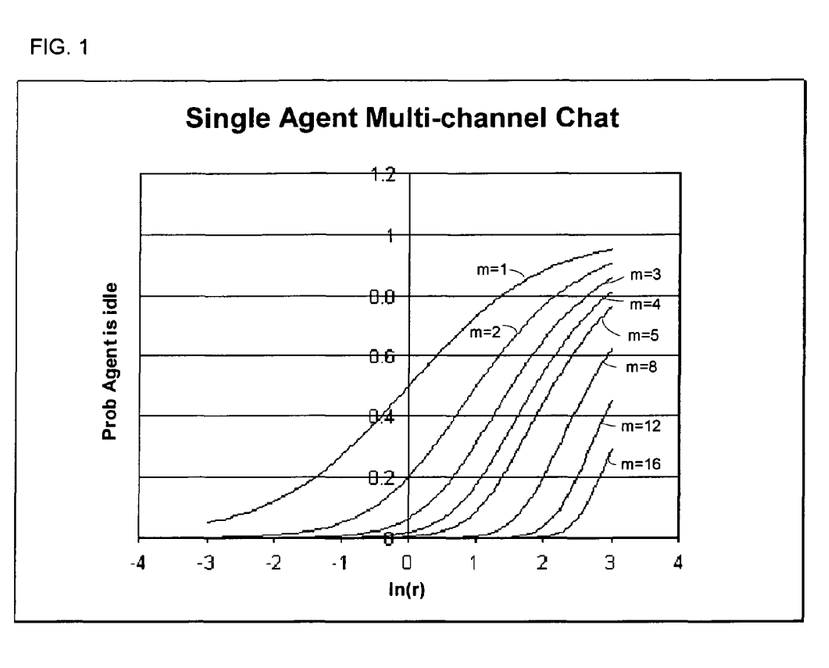
FIG. 1 is a graphical representation of the probability that an agent is idle for various values of several parameters in the case of a single agent multi-channel chat.

This is represented graphically in FIG. 1, where the probability that an agent is idle is plotted versus ln(r) for different values of m, in the case of single skill, saturated, single agent multi-channel chat.

B. Inflation of Handle Time Due to Multiple Channels.

Next, the insights of the above analysis are used to derive a formula for the inflation of the handle time of chat sessions due to multiple channels of chat. H[m] is used to denote the average time for a single agent to complete a chat session with a single contact (in a single channel) when that agent is simultaneously servicing m chat channels. That is, the agent is in single agent multi-channel chat. H[1] is used to denote the average time to complete a single-channel chat session when m=1. That is, one agent is servicing one chat channel.

As discussed above, P[1](0) is the probability the agent is idle during single agent multi-channel chat when there is just one channel. Therefore, 1−P[1](0) is the probability the agent is working during such single-channel chat. Therefore, H[1]*(1−P[1](0)) is the average amount of time the agent spends actually composing messages (i.e., working and not idle waiting to receive the contact's replies) in a chat session when there is a single chat channel and all of the contacts are of a single category.

On the other hand, 1−P[m](0) is the probability an agent is composing a message during single skill, saturated, single agent multi-channel chat for m channels. The probability the agent is composing a message on any given channel is therefore (1−P[m](0))/m. Then, H[m]*(1-P[m](0))/m is the average amount of time the agent spends composing messages to a single contact during the chat session with that contact when the agent is servicing m saturated channels. However, for any contact the average time the agent spends composing the messages that complete a session with that contact is a constant for single skill chat. Therefore, $$H[m]*(1-P[m](0))/m = H[1]*(1-P[1](0))$$

From this equation, a formula can be obtained for an inflation factor of handle time for chat sessions when the contacts are handled in multi-channel chat.

$$H[m]/H[1] = m*(1-P[1](0))/(1-P[m](0))$$

More generally, $$H[m']*(1-P[m'](0))/m' = H[1]*(1-P[1](0))$$

for any m', m'=1, 2, . . . Therefore, $$H[m']*(1-P[m'](0))/m' = H[m]*(1-P[m](0))/m$$

Consequently, a general inflation (deflation) factor of handle time can be given by $$H[m']/H[m] = (m'/m)*(1-P[m](0))/(1-P[m'](0))$$

for any m'=1, 2, 3, . . . and m=1, 2, 3, . . .

Figure 2:
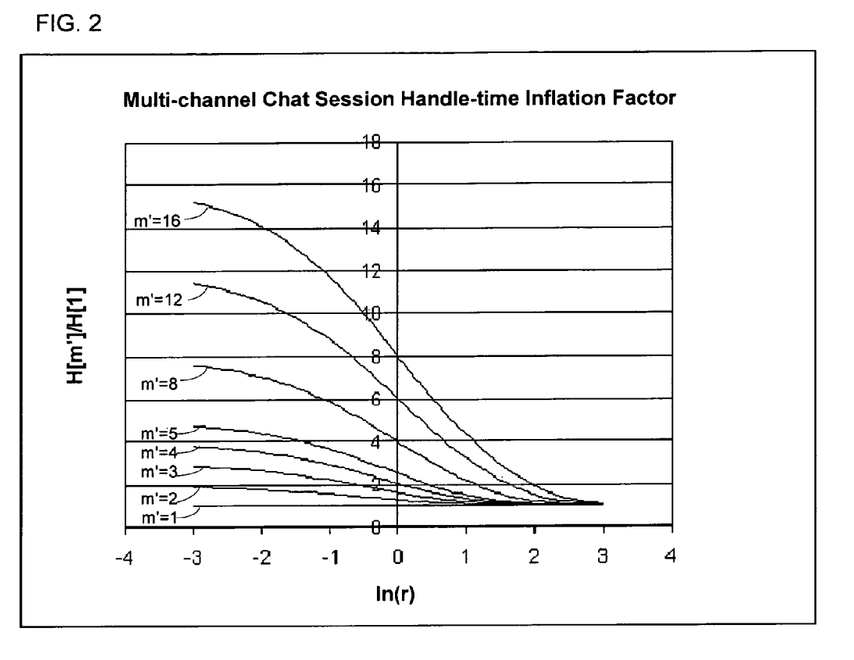
FIG. 2 is a graphical representation of a multi-channel chat session handle time inflation factor for various values of several parameters.

This is represented graphically in FIG. 2, where a chat session handle time inflation factor is plotted versus ln(r) for different numbers of channels m' relative to m=1, in the case of single skill, saturated, single agent multi-channel chat.

Means for deriving an inflated handle time and means for calculating a probability may comprise calculating tools known in the art that can accomplish the computations discussed above, including an Erlang B calculator.

C. Multiple Agents Servicing Multiple Chat Channels

Next, the inflated handle time is used to estimate the number (or at least a minimum number) of agents required to service chat messaging in single skill, multiple agent multi-channel chat—that is, when each agent is simultaneously handling a fixed number of chat channels—in order to achieve a specified service experience goal given certain contact arrival information. For example, a better service experience may equate with a lower projected probability of a contact getting blocked from receiving service, with a lower projected average amount of time in a queue waiting for service, or with a higher projected probability of a contact waiting less than a specified amount of time in a queue. These specific examples of service experience are among those that concern the service experienced until a contact is first connected with an agent. Such experience until initial connection with an agent is frequently characterized in the art as quality of service.

The standard Erlang models do not directly describe the statistics of multiple chat channels, where one agent is "simultaneously" handling many contacts. The approach taken is to transform the problem of multiple chat channels to a related problem that is more appropriate for the standard Erlang calculations. In particular, a situation where k agents are each servicing m' chat channels will be treated as if there were k*m' effective agents each servicing a single channel with an inflated handle time that depends on m'. Given certain contact arrival information, an inflated handle time, and a quality of service goal, the standard Erlang calculations can be performed to estimate a required number of effective agents, and means for computing a number of effective agents may comprise standard Erlang calculators. Dividing the number of effective agents by the number of chat channels that each agent is actually servicing provides an estimate of the number of actual agents required to meet the quality of service goal, and means for obtaining the number of actual agents may comprise calculating tools known in the art.

Figure 3:
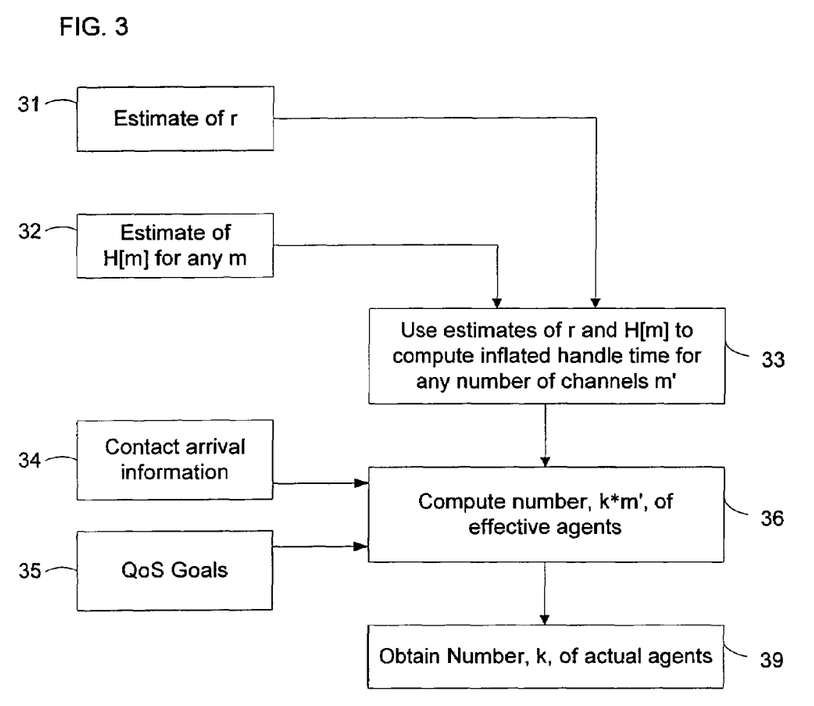
FIG. 3 is a simplified block diagram illustrating an example of a method incorporating the invention.

FIG. 3 is a simplified block diagram illustrating an example. Use is made of estimates of certain numerical parameters that characterize the contact/agent interactions. As per blocks 31 and 32, estimates are made for r and for H[m]. Means for receiving estimates, including r, may comprise computing input and temporary storage features known in the art.

As defined above, r=a/c, the ratio of the respective instantaneous rates at which agents and contacts complete and send messages they are composing. As discussed above, only a single agent category-contact category pair applies for single skill chat, and a and c are assumed to be constants. In that case, a=1/A and c=1/C, where A is the average length of time agents spend composing a single chat message and C is the average length of time that contacts spend composing a single chat message. Then, r=C/A, and may be approximated from historical observations.

As defined above, H[m] is the average length of time to complete a chat session in saturated, single agent multi-channel chat when there are m channels. H[m] can be approximated by observing m-channel multi-chat for a single saturated agent. Any value of m can be used, and m=1 (one channel of chat) may be the easiest to use for estimating H[m].

As per block 33, those estimates of r and of H[m] are applied to the formula derived above to compute the inflated handle time H[m'] for a single agent to complete a chat session when that agent is simultaneously servicing m' chat channels, where m' can be any number of channels. That is, $$H[m'] = H[m]*(m'/m)*(1-P[m](0))/(1-P[m'](0)).$$

As per block 36, a number of effective agents is computed, via standard Erlang calculations, using certain contact arrival information (block 34), a quality of service goal (block 35), and the inflated handle time computed (block 33) for the selected number of channels m'. As discussed above, by using an inflated handle time associated with single agent, m'-channel chat in that computation, k*m' effective agents (each servicing a single channel) are equivalent to k agents (each servicing m' channels). As per block 39, a number, k, of actual agents required to meet the quality of service goal for m'-channel chat can be obtained by dividing the computed number, k*m', of effective agents by m'.

Erlang B, C, and Abandon models are examples of standard Erlang calculations that may be applied in the usual way as is known in the art.

Figure 4:
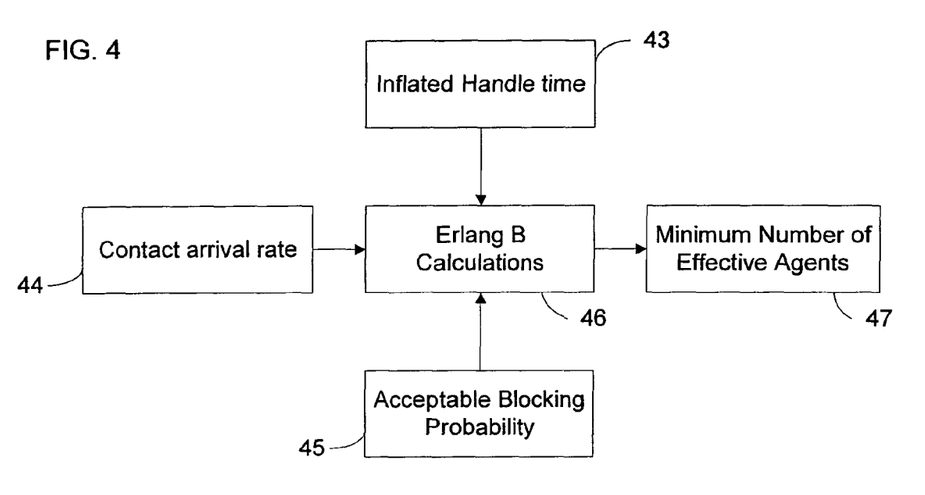
FIG. 4 is a simplified block diagram illustrating an example of an application of an Erlang B model.

FIG. 4 is a simplified block diagram illustrating an example of an application of an Erlang B model. The assumptions of the illustrated example include that there is no queuing of arriving contacts. When all agents are already occupied, an arriving contact is simply blocked from receiving service in that case. As input, a typical Erlang B calculator would accept, for example, an inflated handle time (block 43), a predicted contact arrival rate (block 44), and a quality of service goal expressed, for example, as an acceptable probability (block 45) that an arriving contact will be blocked. The Erlang B model calculations (block 46) would output a minimum number of efffective agents (block 47) required to meet or exceed the quality of service goal. For example, for a predicted contact arrival rate, and for an inflated handle time associated with single agent, m'-channel chat that is computed as discussed above, an Erlang B calculator can compute a number of effective agents required to achieve a particular blocking probability that is deemed to be acceptably low.

Figure 5:
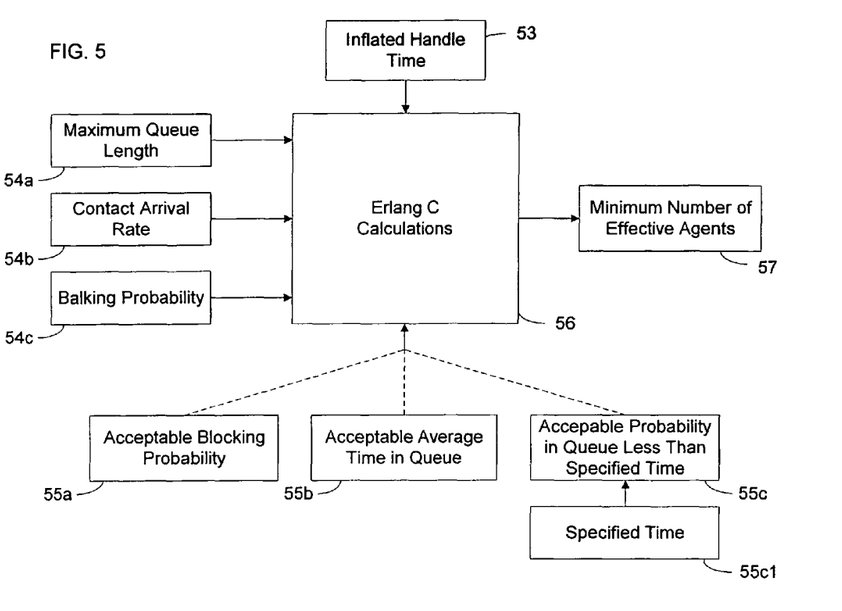
FIG. 5 is a simplified block diagram illustrating an example of an application of an Erlang C model.

FIG. 5 is a simplified block diagram illustrating an example of an application of an Erlang C model. The assumptions of the illustrated example include that when all agents are occupied, arriving contacts may be queued for service at a later time as agents become available. If the queue itself is full, then any arriving contacts will be blocked. If the queue is not empty, some contacts may refuse to enter the queue and balk at the offer of service. As input, a typical Erlang C calculator would accept, for example, certain contact arrival information, an inflated handle time (block 53), and a quality of service goal. The contact arrival information would include, for example, a maximum queue length (block 54a), a predicted contact arrival rate (block 54b), and a predicted balking probability (block 54c). The quality of service goal would be expressed, for example, as an acceptable probability (block 55a) that an arriving contact will be blocked, as an acceptable average amount of time (block 55b) that a contact will spend waiting in the queue, or as an acceptable probability (block 55c) that a contact will spend less than a specified amount of time (block 55c1) waiting in the queue. The Erlang C model calculations (block 56) would output a minimum number of effective agents (block 57) required to meet or exceed the quality of service goal.

For example, for a maximum queue length, a predicted contact arrival rate, and a predicted balking probability, and for an inflated handle time associated with a single agent, m'-channel chat that is computed as discussed above, an Erlang C calculator can compute a number of effective agents required to achieve a particular quality of service goal; where the quality of service goal may be, for example, a particular blocking probability that is deemed to be acceptably low, a particular average queue time that is deemed to be acceptably low, or a particular probability that is deemed to be acceptably high that queue time will be less than a specified amount of time.

Figure 6:
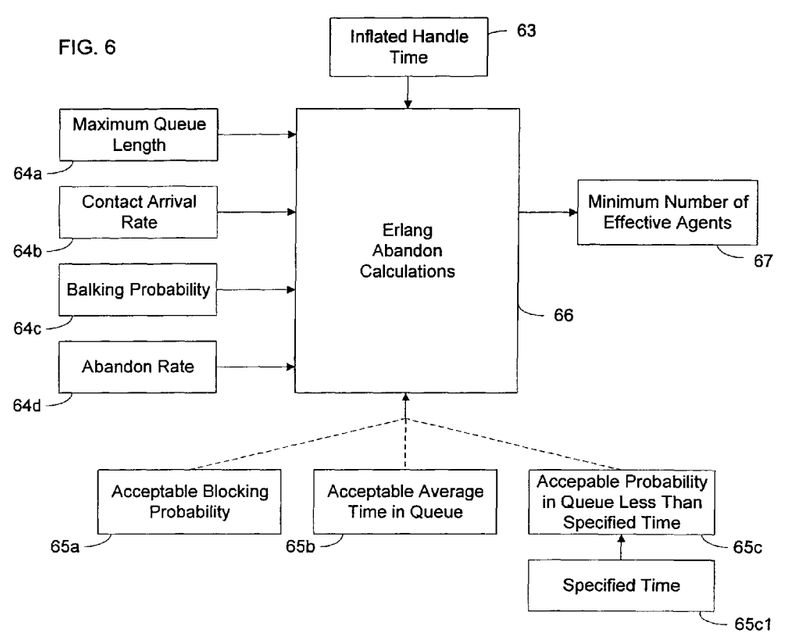
FIG. 6 is a simplified block diagram illustrating an example of an application of an Erlang Abandon model.

FIG. 6 is a simplified block diagram illustrating an example of an application of an Erlang Abandon model. The block numbering corresponds with the block numbering in FIG. 5. That is, block 63 in FIG. 6 corresponds with block 53 in FIG. 5, and so forth. The assumptions of the illustrated example include all those of the Erlang C model, and the additional assumption that queued contacts will renege on the offer of service and abandon the queue at a definite rate. As input, a typical Erlang Abandon calculator would accept an abandon rate (block 64d) in addition to all the inputs to an Erlang C calculator. The Erlang Abandon model calculations (block 66) would output a minimum number of effective agents (block 67) required to meet or exceed the quality of service goal.

For example, for a maximum queue length, a predicted contact arrival rate, a predicted balking probability, and a predicted abandon rate, and for an inflated handle time associated with a single agent, m'-channel chat that is computed as discussed above, an Erlang Abandon calculator can compute a number of effective agents required to achieve a particular quality of service goal; where the quality of service goal may be, for example, a particular blocking probability that is deemed to be acceptably low, a particular average queue time that is deemed to be acceptably low, or a particular probability that is deemed to be acceptably high that queue time will be less than a specified amount of time.

D. A Numerical Example

As a numerical example, assume that, for a particular agent category-contact category pair, the ratio of the amount of time the contact is composing messages to the amount of time the agent is composing messages is estimated to be 0.75. That is, $r=a/c=0.75$.

Assume that, with a single chat channel (m=1), the average length of a chat session is estimated to be 500 seconds. That is, $H[1]=500$.

Assume that each agent will be working 3 chat channels. That is, $m'=3$.

The inflated handle time would be given by $$H[3] = H[1] * (3) * (1 - P[1](0)) / (1 - P[3](0))$$
$$= H[1] * (3) * (1 - Q[1](1)) / (1 - Q[3](3))$$
$$= 500 * (3) * (1 - 0.428571) / (1 - 0.033457)$$
$$= 1500 * (0.571429) / (0.966543)$$
$$= 886.8132$$

That is, the average handle time of a chat session would be inflated from 500 seconds for single channel chat to almost 887 seconds for 3-channel chat. The values of $Q[1](1)$ and $Q[3](3)$ were obtained from two Erlang B calculations of blocking probability using an arrival rate of 0.75, an average handle time of 1, and the number of servers (trunks) set to 1 and 3, respectively. (In general, to obtain the value of $Q[m](m)$ from an Erlang B calculator, the arrival rate can be set to r, the handle time can be set to 1, and the number of servers or trunks can be set to m.)

In this example, an Erlang C model will be used to compute a required number of effective agents. Assume that the maximum queue length is not bounded and that no contacts balk when offered to wait in the queue. Further, assume that contacts are expected to arrive at a mean rate of 100 contacts in a 30 minute interval, and that the goal is to service 80% of those contacts in less than 30 seconds.

Based on these assumptions, the inputs to the Erlang calculator are that the maximum queue length is infinite, the contact arrival rate is 100/30 calls per minute, the balking probability is 0, the handle time is the inflated value of 886.8132 seconds, and the quality of service goal is set so that the probability that a contact will be required to wait less than 30 seconds is greater than or equal to 0.8. Passing these inputs to an Erlang C calculator yielded, as its output, that the required number of effective agents was 56.13121.

Dividing the number of effective agents (56.13121) by the number of channels (3) yields about 18.7. That is, it is estimated that 19 actual multi-channel agents, each serving three chat channels, would be required to meet the quality of service goals in this numerical example.

It is seen that an administrator of multiple agent multi-channel chat may evaluate some of the costs, risks to customer experience, and benefits associated with changes in the number of channels and the number of agents. For example, one can estimate the change in required staff given a change in the number of chat channels. For example, using the statistics of the numerical example presented above, one finds

| Number of channels | Required staff | Marginal required staff |
|---|---|---|
| 1 | 33 | −11 |
| 2 | 22 | −3 |
| 3 | 19 | −1 |
| 4 | 18 | 0 |
| 5 | 18 | |

This suggests that, from the point of view of required staff, four chat channels are locally optimal for this numerical example's statistics and quality of service goals.

Because H[m] is the average duration of a chat session, one can use the values of H[m] as a metric to assess the potential impact of changes in the number of chat channels on a contact's service experience. For example, using the statistics of the numerical example presented above, one finds

| Number of channels: m | Chat session duration: H[m] | Marginal chat session duration |
|---|---|---|
| 1 | 500.00 | 163.27 |
| 2 | 663.27 | 223.54 |
| 3 | 886.81 | 263.22 |
| 4 | 1150.03 | |

This suggests that in changing from 3 to 4 channels, the contact may expect to experience an increase of over 4 minutes in the duration of the chat session. An administrator might decide that in the interest of the business it would be better to staff 19 agents on 3 channels and save the customer 4 minutes of idle time waiting for response messages from an agent.

As another example, one also can repeat the computations with different values for the quality of service goal, to assess the impact on the quality of service that likely would result from changing the number of agents. For example, the numerical example presented above used a goal to service 80% of arriving contacts in less than 30 seconds. In addition to varying the number of chat channels, one also can vary the length of the waiting period and the percentage of contacts being served within the waiting period, to explore the range of quality of service that can be supported by different numbers of agents.

From the foregoing, it will be observed that numerous modifications and variations can be effectuated without departing from the true spirit and scope of the novel concepts of the present invention. It is to be understood that no limitation with respect to the specific embodiments illustrated or described is intended or should be inferred.

What is claimed is:

1. A method of administering an automatic contact distribution (ACD) system, the method comprising:
   estimating a minimum number of actual agents required to meet a specified quality of service goal for certain contact arrival information concerning contacts arriving on a selected number of chat channels in the ACD system, chat being real-time communication between one of the agents and one of the contacts via an electronic communication network, and the selected number of chat channels being a maximum number of contacts with whom a single agent will be engaged in chat at any one time, the estimating step comprising:
   a) deriving an inflated handle time of chat sessions for the selected number of chat channels, each of the chat sessions being exchanges of chat messages, each of the chat messages being a unit of communication composed by a sender who triggers a send event at an end of a composition interval, where the unit of communication is sent in real-time to a recipient upon triggering of the send event, and the inflated handle time being a projected average duration of each of the chat sessions given the selected number of chat channels;
   b) computing a number of effective agents using an Erlang calculator, the number of effective agents being a minimum number of agents that would be required to meet the specified quality of service goal given the contact arrival information and the inflated handle time, if it were assumed that each of the effective agents were servicing a single chat channel and that an average duration of chat sessions of the effective agents were the inflated handle time;
   c) obtaining the number of actual agents by dividing the number of effective agents by the selected number of chat channels.

2. The method in accordance with claim 1,
   the contact arrival information comprising a predicted contact arrival rate;
   the quality of service goal comprising a specified probability that an arriving contact will be blocked from receiving service;
   the Erlang calculator comprising an Erlang B calculator.

3. The method in accordance with claim 1,
   the contact arrival information comprising a maximum length of a queue, a predicted contact arrival rate, and a predicted probability that a contact will balk at an offer of service if the queue is not empty;
   the quality of service goal being selected from a group consisting of: a specified probability that an arriving contact will be blocked from receiving service, a specified average amount of time that a contact will spend waiting in the queue, and a specified probability that a contact will spend less than a specified amount of time waiting in the queue;
   the Erlang calculator comprising an Erlang C calculator.

4. The method in accordance with claim 1,
   the contact arrival information comprising a maximum length of a queue, a predicted contact arrival rate, a predicted probability that a contact will balk at an offer of service if the queue is not empty, and a predicted rate at which queued contacts will renege on the offer of service and will abandon the queue;
   the quality of service goal being selected from a group consisting of: a specified probability that an arriving contact will be blocked from receiving service, a specified average amount of time that a contact will spend waiting in the queue, and a specified probability that a contact will spend less than a specified amount of time waiting in the queue;
   the Erlang calculator comprising an Erlang Abandon calculator.

5. The method in accordance with claim 1, the deriving step comprising using estimates of at least two numerical parameters that characterize contact/agent interactions.

6. The method in accordance with claim 1, the deriving step comprising using an estimate of an average duration of chat sessions of agents servicing a chosen number of chat channels.

7. The method in accordance with claim 1,
the actual agents being in an agent category based on at least one factor selected from a group consisting of: communication subject matter, training in the communication subject matter, experience in the communication subject matter, training in chat messaging, experience in chat messaging, training in multi-channel chat messaging, and experience in multi-channel chat messaging;
the contacts being in a contact category based on at least one factor selected from a group consisting of: the communication subject matter, training in the communication subject matter, experience in the communication subject matter, training in chat messaging, and experience in chat messaging;
the deriving step comprising using an estimate of a ratio of an instantaneous rate at which the actual agents complete and send the chat messages they compose to an instantaneous rate at which the contacts complete and send the chat messages they compose, the ratio being a characteristic of a pair consisting of the agent category and the contact category.

8. The method in accordance with claim 1, the deriving step comprising:
using an estimate of a ratio of an average length of time that the contacts spend composing a single chat message to an average length of time that the actual agents spend composing a single chat message, and
using an estimate of an average duration of chat sessions of agents servicing a chosen number of chat channels.

9. The method in accordance with claim 1, the deriving step comprising using a formula for a probability that all of the contacts who are engaged in chat with a particular agent at any one time will be in a composition interval for a chat message, as opposed to any of the contacts who is engaged in chat with the particular agent being idle and waiting for a reply chat message from the particular agent.

10. The method in accordance with claim 1, the deriving step comprising:
using an estimate of an average duration of chat sessions of agents servicing a chosen number of chat channels, where "m" represents the chosen number and "H[m]" represents the average duration of chat sessions for m channels;
using an estimate of a ratio of an average length of time that the contacts spend composing a single chat message to an average length of time that the actual agents spend composing a single chat message, where "r" represents the ratio;
computing the inflated handle time with the following formula:

$$H[m']=H[m]*(m'/m)*(1-P[m](0))/(1-P[m'](0)),$$

where "m'" represents the selected number of chat channels, where "H[m']" represents the inflated handle time, and where for x=m and for x=m', as applicable, $$P[x](0)=(r^x/x!)*(1/(1+r/1!+r^2/2!+\ldots+r^x/x!)).$$

11. The method in accordance with claim 1, further comprising:
repeating the estimating step for each one of a plurality of numbers of chat channels, each time substituting the respective one of the plurality of numbers of chat channels for the selected number of chat channels;
comparing the estimated minimum number of actual agents for each one of the plurality of numbers of chat channels to determine a change in the minimum number of actual agents required to meet the specified quality of service goal for each change in the number of chat channels.

12. The method in accordance with claim 11, further comprising:
comparing the inflated handle time derived in the deriving step for each one of the plurality of numbers of chat channels to determine the change in the inflated handle time for each change in the number of chat channels;
for each change in the number of chat channels, comparing the corresponding change in the minimum number of actual agents to the corresponding change in the inflated handle time to determine a change in the inflated handle time for each change in the minimum number of actual agents.

13. The method in accordance with claim 1, further comprising:
repeating the estimating step for each one of a plurality of quality of service goals for the selected number of chat channels, each time substituting the respective one of the plurality of quality of service goals for the specified quality of service goal;
identifying the quality of service goal for which the estimate of the required number of actual agents corresponds with an assigned number of actual agents to estimate a quality of service goal that can be sustained by the assigned number of actual agents.

14. The method in accordance with claim 13, further comprising repeating the steps of claim 13 for each of a plurality of numbers of chat channels, each time substituting the respective one of the plurality of numbers of chat channels for the selected number of chat channels, to determine quality of service goals that can be sustained by the assigned number of actual agents for each of the plurality of numbers of chat channels.

15. A work management system to estimate a minimum number of actual agents required to meet a specified quality of service goal for certain contact arrival information concerning contacts arriving on a selected number of chat channels in an automatic contact distribution (ACD) system, chat being real-time communication between one of the agents and one of the contacts via an electronic communication network, and the selected number of chat channels being a maximum number of contacts with whom a single agent will be engaged in chat at any one time, the system comprising:
an inflated handle time module to derive an inflated handle time of chat sessions for the selected number of chat channels, each of the chat sessions being exchanges of chat messages, each of the chat messages being a unit of communication composed by a sender who triggers a send event at an end of a composition interval, where the unit of communication is sent in real-time to a recipient upon triggering of the send event, and the inflated handle time being a projected average duration of each of the chat sessions given the selected number of chat channels;
an Erlang calculator to compute a number of effective agents, the number of effective agents being a minimum number of agents that would be required to meet the specified quality of service goal given the contact arrival information and the inflated handle time, if it were assumed that each of the effective agents were servicing a single chat channel and that an average duration of chat sessions of the effective agents were the inflated handle time;

a quotient module to obtain the number of actual agents by dividing the number of effective agents by the selected number of chat channels.

16. The system in accordance with claim 15, the contact arrival information comprising a predicted contact arrival rate;

the quality of service goal comprising a specified probability that an arriving contact will be blocked from receiving service;

the Erlang calculator comprising an Erlang B calculator.

17. The method in accordance with claim 15, the contact arrival information comprising a maximum length of a queue, a predicted contact arrival rate, and a predicted probability that a contact will balk at an offer of service if the queue is not empty;

the quality of service goal being selected from a group consisting of: a specified probability that an arriving contact will be blocked from receiving service, a specified average amount of time that a contact will spend waiting in the queue, and a specified probability that a contact will spend less than a specified amount of time waiting in the queue;

the Erlang calculator comprising an Erlang C calculator.

18. The system in accordance with claim 15, the contact arrival information comprising a maximum length of a queue, a predicted contact arrival rate, a predicted probability that a contact will balk at an offer of service if the queue is not empty, and a predicted rate at which queued contacts will renege on the offer of service and will abandon the queue;

the quality of service goal being selected from a group consisting of: a specified probability that an arriving contact will be blocked from receiving service, a specified average amount of time that a contact will spend waiting in the queue, and a specified probability that a contact will spend less than a specified amount of time waiting in the queue;

the Erlang calculator comprising an Erlang Abandon calculator.

19. The system in accordance with claim 15, the inflated handle time module comprising at least two receivers to receive, respectively, estimates of at least two numerical parameters that characterize contact/agent interactions.

20. The system in accordance with claim 15, the inflated handle time module comprising a receiver to receive an estimate of an average duration of chat sessions of agents servicing a chosen number of chat channels.

21. The system in accordance with claim 15, the actual agents being in an agent category based on at least one factor selected from a group consisting of: communication subject matter, training in the communication subject matter, experience in the communication subject matter, training in chat messaging, experience in chat messaging, training in multi-channel chat messaging, and experience in multi-channel chat messaging;

the contacts being in a contact category based on at least one factor selected from a group consisting of: the communication subject matter, training in the communication subject matter, experience in the communication subject matter, training in chat messaging, and experience in chat messaging;

the inflated handle time module comprising a receiver to receive an estimate of a ratio of an instantaneous rate at which the actual agents complete and send the chat messages they compose to an instantaneous rate at which the contacts complete and send the chat messages they compose, the ratio being a characteristic of a pair consisting of the agent category and the contact category.

22. The system in accordance with claim 15, the inflated handle time module comprising:

a first receiver to receive an estimate of an average duration of chat sessions of agents servicing a chosen number of chat channels;

a second receiver to receive an estimate of a ratio of an average length of time that the contacts spend composing a single chat message to an average length of time that the actual agents spend composing a single chat message.

23. The system in accordance with claim 15, the inflated handle time module comprising a calculator to calculate a probability that all of the contacts who are engaged in chat with a particular agent at any one time will be in a composition interval for a chat message, as opposed to any of the contacts who is engaged in chat with the particular agent being idle and waiting for a reply chat message from the particular agent.

24. The system in accordance with claim 15, the inflated handle time module comprising:

a first receiver to receive an estimate of an average duration of chat sessions of agents servicing a chosen number of chat channels, where "m" represents the chosen number and "H[m]" represents the average duration of chat sessions for m channels;

a second receiver to receive an estimate of a ratio of an average length of time that the contacts spend composing a single chat message to an average length of time that the actual agents spend composing a single chat message, where "r" represents the ratio;

an Erlang B calculator to calculate the inflated handle time with the following formula:

$$H[m']=H[m]*(m'/m)*(1-P[m](0))/(1-P[m'](0)),$$

where "m'" represents the selected number of chat channels, where "H[m']" represents the inflated handle time, and where for x=m and for x=m', as applicable, $$P[x](0)=(r^x/x!)*(1/(1+r/1!+r^2/2!+ \ldots +r^x/x!)).$$

25. A work management system to estimate a minimum number of actual agents required to meet a specified quality of service goal for certain contact arrival information concerning contacts arriving on a selected number of chat channels in an automatic contact distribution (ACD) system, chat being real-time communication between one of the agents and one of the contacts via an electronic communication network, and the selected number of chat channels being a maximum number of contacts with whom a single agent will be engaged in chat at any one time, the system comprising:

means for deriving an inflated handle time of chat sessions for the selected number of chat channels, each of the chat sessions being exchanges of chat messages, each of the chat messages being a unit of communication composed by a sender who triggers a send event at an end of a composition interval, where the unit of communication is sent in real-time to a recipient upon triggering of the send event, and the inflated handle time being a projected average duration of each of the chat sessions given the selected number of chat channels;

means for computing a number of effective agents, the number of effective agents being a minimum number of agents that would be required to meet the specified quality of service goal given the contact arrival information and the inflated handle time, if it were assumed that each of the effective agents were servicing a single chat channel and that an average duration of chat sessions of the effective agents were the inflated handle time;

means for obtaining the number of actual agents by dividing the number of effective agents by the selected number of chat channels.

26. The system in accordance with claim 25, the contact arrival information comprising a predicted contact arrival rate;

the quality of service goal comprising a specified probability that an arriving contact will be blocked from receiving service.

27. The method in accordance with claim 25, the contact arrival information comprising a maximum length of a queue, a predicted contact arrival rate, and a predicted probability that a contact will balk at an offer of service if the queue is not empty;

the quality of service goal being selected from a group consisting of: a specified probability that an arriving contact will be blocked from receiving service, a specified average amount of time that a contact will spend waiting in the queue, and a specified probability that a contact will spend less than a specified amount of time waiting in the queue.

28. The system in accordance with claim 25, the contact arrival information comprising a maximum length of a queue, a predicted contact arrival rate, a predicted probability that a contact will balk at an offer of service if the queue is not empty, and a predicted rate at which queued contacts will renege on the offer of service and will abandon the queue;

the quality of service goal being selected from a group consisting of: a specified probability that an arriving contact will be blocked from receiving service, a specified average amount of time that a contact will spend waiting in the queue, and a specified probability that a contact will spend less than a specified amount of time waiting in the queue.

29. The system in accordance with claim 25, the actual agents being in an agent category based on at least one factor selected from a group consisting of: communication subject matter, training in the communication subject matter, experience in the communication subject matter, training in chat messaging, experience in chat messaging, training in multi-channel chat messaging, and experience in multi-channel chat messaging;

the contacts being in a contact category based on at least one factor selected from a group consisting of: the communication subject matter, training in the communication subject matter, experience in the communication subject matter, training in chat messaging, and experience in chat messaging;

the inflated handle time deriving means comprising a means for receiving an estimate of a ratio of an instantaneous rate at which the actual agents complete and send the chat messages they compose to an instantaneous rate at which the contacts complete and send the chat messages they compose, the ratio being a characteristic of a pair consisting of the agent category and the contact category.

30. The system in accordance with claim 25, the inflated handle time deriving means comprising a means for calculating a probability that all of the contacts who are engaged in chat with a particular agent at any one time will be in a composition interval for a chat message, as opposed to any of the contacts who is engaged in chat with the particular agent being idle and waiting for a reply chat message from the particular agent.

* * * * *